US009110576B1

(12) United States Patent
Kim et al.

(10) Patent No.: US 9,110,576 B1
(45) Date of Patent: Aug. 18, 2015

(54) DISPLAY DEVICE AND METHOD FOR CONTROLLING THE SAME

(71) Applicant: LG ELECTRONICS INC., Seoul (KR)

(72) Inventors: Jihwan Kim, Seoul (KR); Sihwa Park, Seoul (KR); Doyoung Lee, Seoul (KR); Sinae Chun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/259,786

(22) Filed: Apr. 23, 2014

(30) Foreign Application Priority Data

Mar. 20, 2014 (KR) .......................... 10-2014-0032803

(51) Int. Cl.
| | |
|---|---|
| *H04N 9/80* | (2006.01) |
| *H04N 5/93* | (2006.01) |
| *G06F 3/033* | (2013.01) |
| *G06F 3/0484* | (2013.01) |
| *G06F 3/0488* | (2013.01) |

(52) U.S. Cl.
CPC .......... *G06F 3/04847* (2013.01); *G06F 3/0488* (2013.01)

(58) Field of Classification Search
USPC .................. 386/239–248, 278–290, 353–357
See application file for complete search history.

(56) References Cited

U.S. PATENT DOCUMENTS

| | | | |
|---|---|---|---|
| 2008/0131019 | A1 | 6/2008 | Ng |
| 2010/0128145 | A1 | 5/2010 | Pitts et al. |
| 2011/0080479 | A1 | 4/2011 | Trumbo et al. |
| 2013/0070145 | A1* | 3/2013 | Matsuyama ............. 348/333.12 |
| 2013/0235267 | A1 | 9/2013 | Pitts et al. |
| 2013/0329124 | A1* | 12/2013 | Nagamatsu ................... 348/349 |
| 2014/0013273 | A1* | 1/2014 | Ng ............................... 715/802 |

FOREIGN PATENT DOCUMENTS

| | | | |
|---|---|---|---|
| EP | 2 323 103 A1 | 5/2011 | |
| WO | WO 2013/043488 A1 | 3/2013 | |

\* cited by examiner

*Primary Examiner* — Hung Dang
(74) *Attorney, Agent, or Firm* — Birch, Stewart, Kolasch & Birch, LLP

(57) ABSTRACT

Disclosed herein is a display device comprising: an input sensor unit configured to sense an input, a storage unit configured to store first video data containing refocusable frames, a display unit configured to display visual information including the first video data, and a processor is configured to: when a first input for a first frame of the first video data and a second input for a second frame of the first video data are detected, refocus the first frame based on a position of the detected first input, and refocus the second frame based on a position of the detected second input, generate second video data using the first video data including the refocused first frame and the refocused second frame, wherein the second input is a touch input connected or disconnected to the first input, and the second frame is a frame played after the first frame.

18 Claims, 12 Drawing Sheets

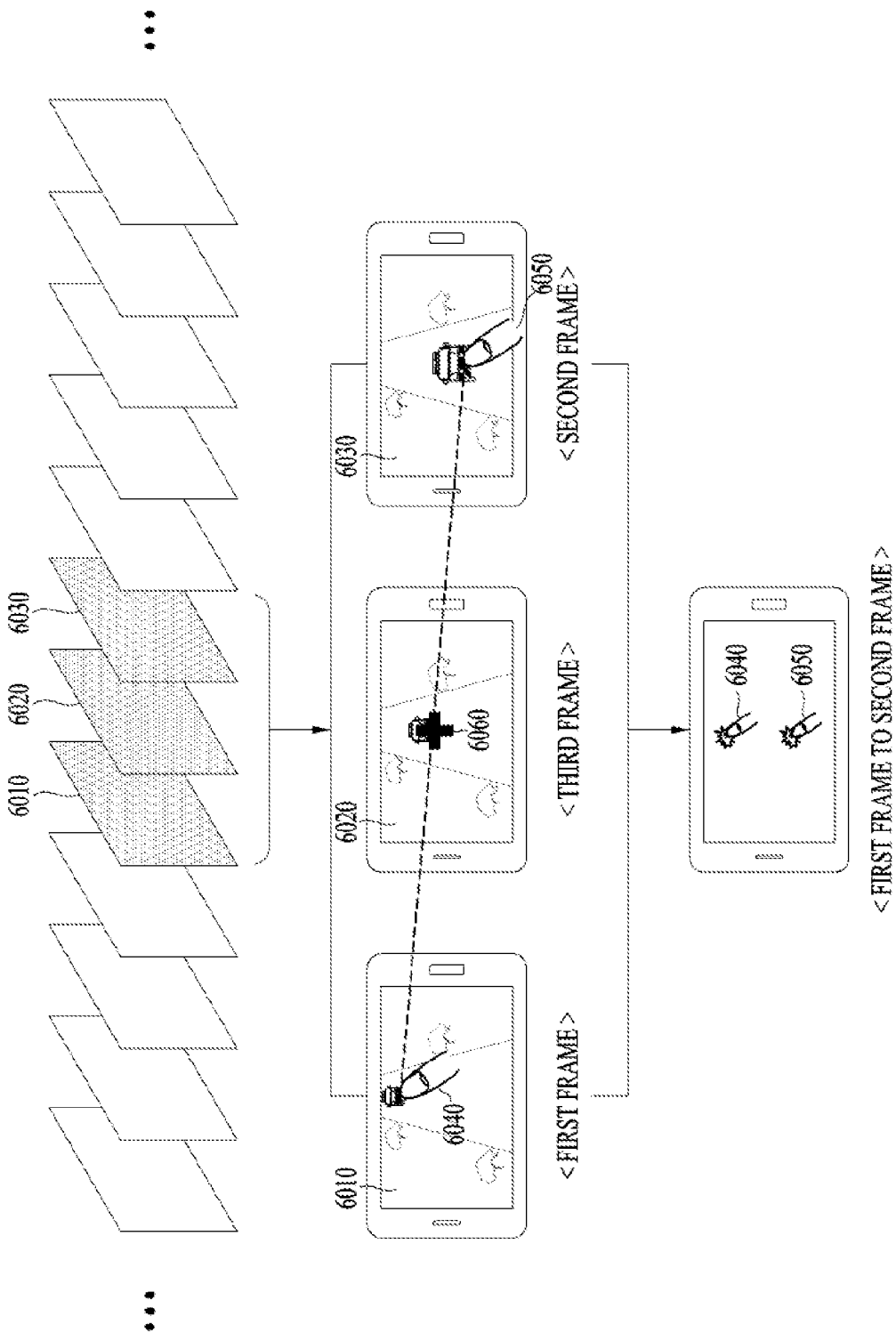

FIG. 7B
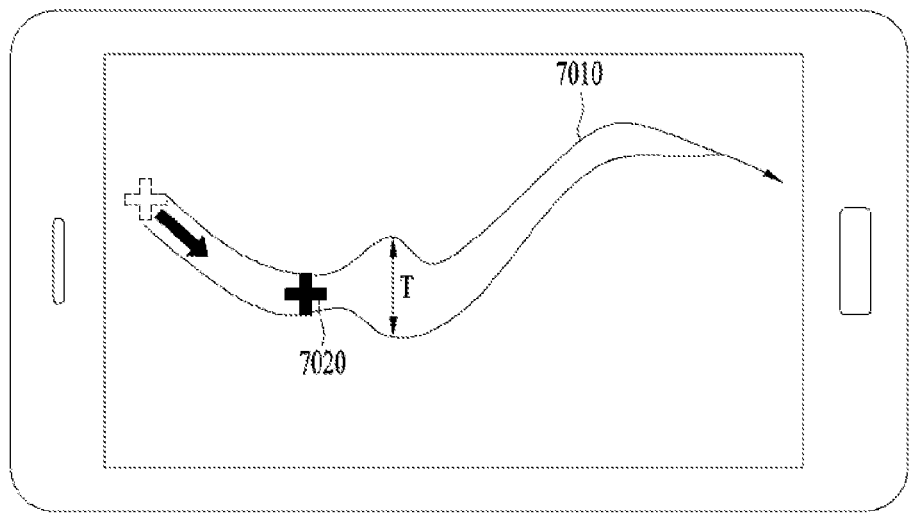
< REFOCUS POSITIONS CONTINUOUSLY DESIGNATED FOR THE ENTIRE FRAMES >
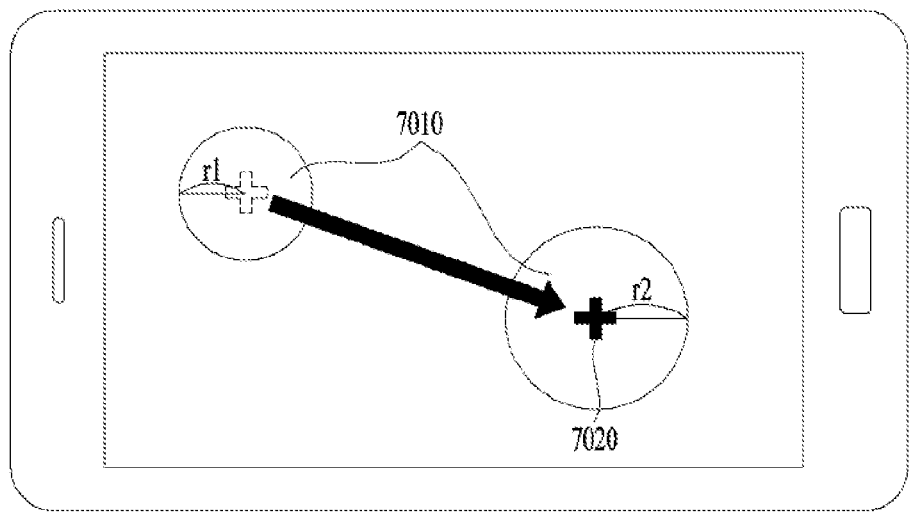
< REFOCUS POSITIONS DISCONTINUOUSLY DESIGNATED FOR THE ENTIRE FRAMES >

FIG. 9
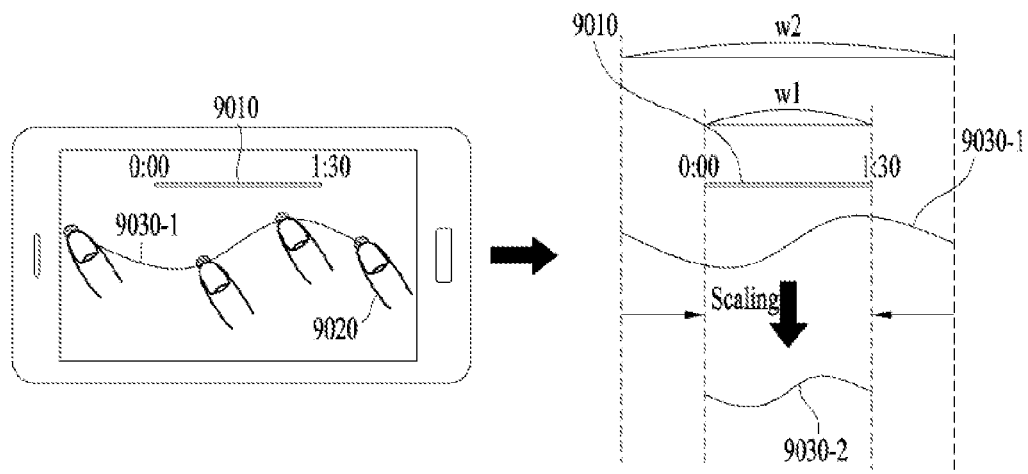
(a)
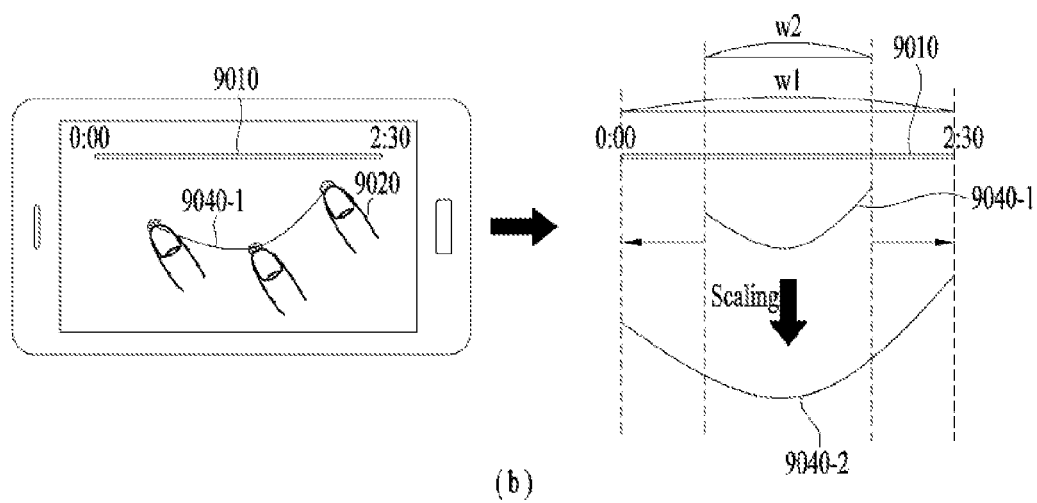
(b)

DISPLAY DEVICE AND METHOD FOR CONTROLLING THE SAME

Pursuant to 35 U.S.C. §119(a), this application claims the benefit of the Korean Patent Application No. 10-2014-0032803, filed on Mar. 20, 2014, which is hereby incorporated by reference as if fully set forth herein.

BACKGROUND OF THE INVENTION

1. Field of the Invention

The present disclosure relates to a method for refocusing for video data containing refocusable frames and a display device for the same and, more particularly, to a display device producing video data with focus edited by refocusing each of the frames contained in the video data based on user inputs to the display device and a method for controlling the same.

2. Discussion of the Related Art

Recent development in photography has enabled refocusing operation for a produced image. This refocusing technique is referred to as a light field technique. Such light field technique allows a produced image to be refocused by recording information about all light rays reflected on an object, particularly light direction information. The light field technique is applicable to various image editing techniques such as image tilting effect, depth image processing, production of 3D images, elimination of noise from images and refocusing of images.

In addition, development of the light field technique has also made it possible to generate video data for which refocusing may be performed. Contrary to image data, the video data dynamically varies with time, and therefore a refocusing method suitable for properties of the video data is needed.

SUMMARY OF THE INVENTION

Accordingly, the present disclosure is directed to a display device and a control method for the same which substantially obviate one or more problems due to limitations and disadvantages of the related art.

An object of the present invention is to provide a display device to detect a refocusing input for each of the frames contained in video data.

Another object of the present invention is to provide a display device to select and provide frames in the playing order according to the length of a refocusing input.

Another object of the present invention is to provide a display device providing a refocus indicator to indicate a refocus position of each of the frames.

Another object of the present invention is to provide a display device providing a timeline interface corresponding to the playing sequence of video data and refocusing frames by detecting refocus inputs based on the timeline interface.

Another object of the present invention is to provide a display device to scale a refocusing input based on the timeline interface and provide the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims thereof as well as the appended drawings.

To achieve these objects and other advantages and in accordance with the purpose of the present disclosure, as embodied and broadly described herein, a display device includes an input sensor unit configured to sense an input, a storage unit configured to store first video data containing refocusable frames, a display unit configured to display visual information including the first video data, and a processor is configured to: when a first input for a first frame of the first video data and a second input for a second frame of the first video data are detected, refocus the first frame based on a position of the detected first input, and refocus the second frame based on a position of the detected second input, generate second video data using the first video data including the refocused first frame and the refocused second frame, wherein the second input is a touch input connected or disconnected to the first input, and the second frame is a frame played after the first frame.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the present disclosure and are incorporated in and constitute a part of this application, illustrate embodiment(s) of the invention and together with the description serve to explain the principle of the invention. In the drawings:

FIG. 6 is a view illustrating a display device designating a refocus position for a frame having no refocus position designated by a refocusing input according to one embodiment;

FIG. 7B is a view illustrating a display device adjusting image properties of a refocus indicator and displaying the refocus indicator in the case that the same point in plural frames is designated as a refocus position, according to one embodiment;

FIG. 9 is a view illustrating a display device scaling and detecting a slide touch input based on a timeline interface and refocusing a frame based on the detected slide touch input according to one embodiment;

DETAILED DESCRIPTION OF THE INVENTION

Figure 1:
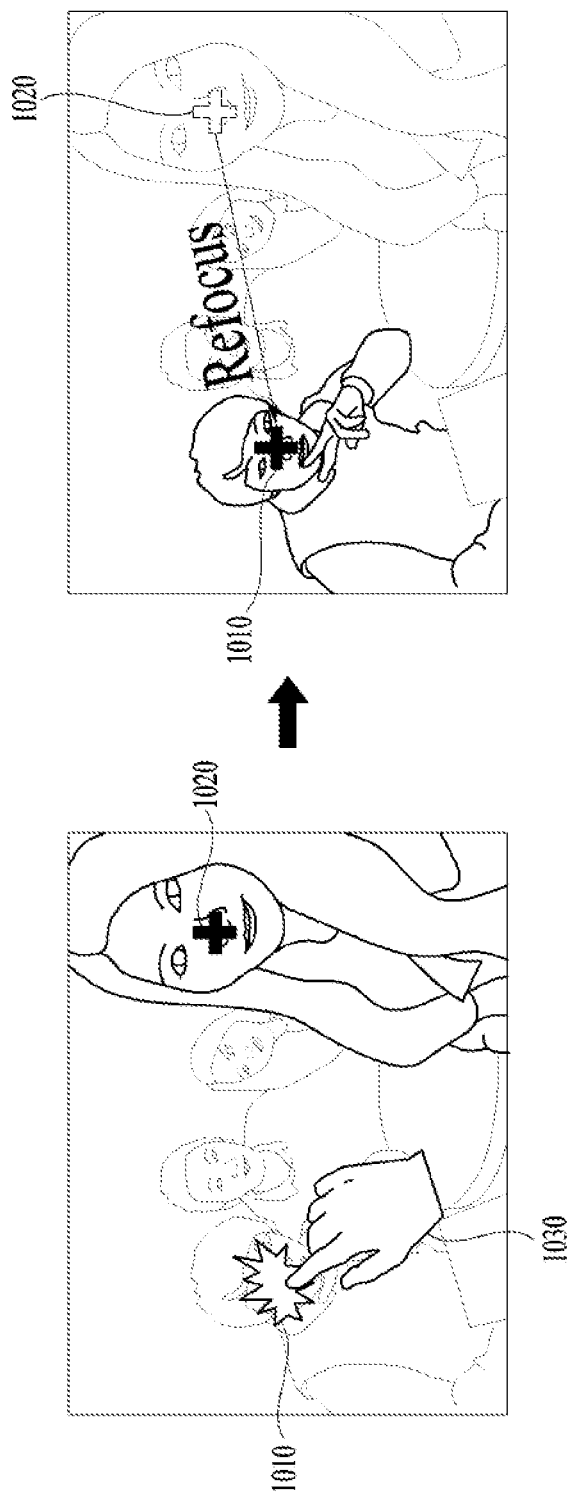
FIG. 1 is a view illustrating a display device refocusing an image based on an input to the device according to an exemplary embodiment.

Reference will now be made in detail to the preferred embodiments of the present invention, examples of which are illustrated in the accompanying drawings. Wherever possible, the same reference numbers will be used throughout the drawings to refer to the same or like parts. However, the scope of the present disclosure is not limited to the embodiments.

Although the terms used in this specification are selected, as much as possible, from general terms that are widely used in the art at present while taking into consideration of the functions, these terms may be replaced by other terms according to intentions of those skilled in the art, customs, emergence of new technologies, or the like. In addition, in a specific case, terms that are arbitrarily selected by the applicant may be used. In this case, meanings of these terms may be disclosed in corresponding description parts of this specification. Accordingly, it should be noted that the terms used herein should be construed based on practical meanings thereof and the whole content of this specification, rather than being simply construed based on names of the terms.

Although embodiments are described in detail below with reference to the accompanying drawings and content in the drawings, the present disclosure is not limited by the illustrated embodiments. Hereinafter, the display device will be simply referred to as 'device' for simplicity of illustration.

FIG. 1 is a view illustrating a display device refocusing an image based on an input to the device according to an exemplary embodiment.

The device may generate a refocusable image using a refocusing technology (for example, a light field technique). Herein, the refocusing technique is a technique of storing information about all light rays introduced through a camera lens in producing an image to allow refocusing for the generated image. Specifically, the refocusing technique is a technique of recording "direction information" about all light rays reflected on an object in producing an image. As a result, the device may refocus a point which is out of focus by reinforcing light at the point using the direction information about the light even after an image is generated.

More specifically, the device may generate a refocusable image using a camera unit including a special lens and a sensor which are used in the refocusing. The generated image may be an image in which a first point 1020 is in focus. At this time, in the case that a refocusing input 1030 for refocusing a second point 1010 which has been out of focus is detected, the device may refocus the second point 1010. According to one embodiment, the input for refocusing the second point 1010 may be a touch input 1030 that touches the second point 1010. The device may correct the image using direction information about light recorded in producing the image such that the second point 1010 gets in focus. As a result, the focused position on the image may change from the first point 1020 to the second point 1010.

Hereinafter, description will be given of a display device refocusing video data containing refocusable images as frames. Accordingly, a frame or video data described below may represent refocusable video data or refocusable frame generated based on the aforementioned refocusing technology.

Figure 2:
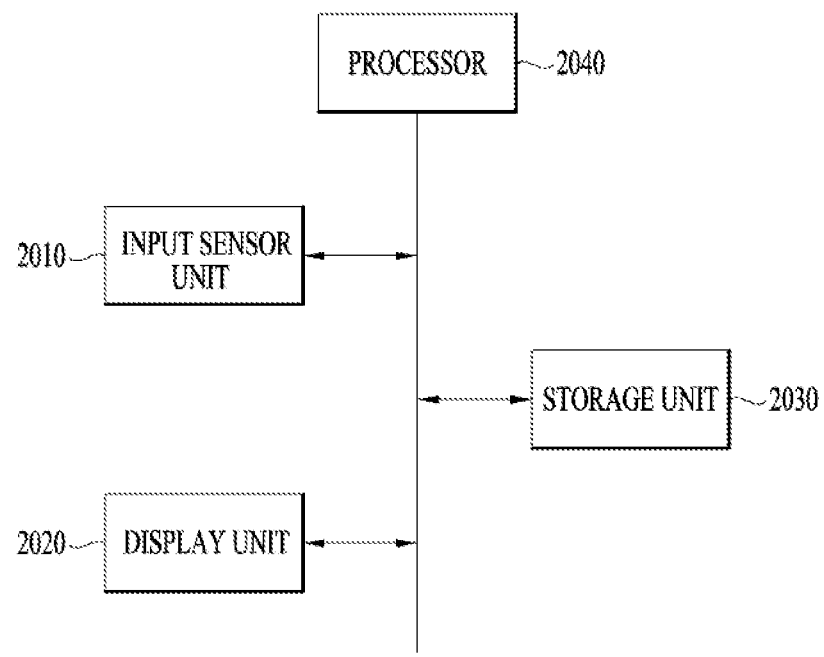
FIG. 2 is a block diagram illustrating a display device according to one embodiment.

FIG. 2 is a block diagram illustrating a display device according to one embodiment. Referring to FIG. 2, the display device may include an input sensor unit 2010, a display unit 2020, a storage unit 2030 and a processor 2040.

The input sensor unit 2010 may use at least one sensor mounted to the device to transfer a user input or an environment recognized by the device to the processor 2040. More specifically, the input sensor unit 2010 may use at least one sensor mounted to the device to sense a touch input. Herein, the at least one sensor may include various touch sensing means for sensing a touch input to the device such as a touch sensor, a fingerprint sensor, a motion sensor, a proximity sensor, an illumination sensor, and a pressure sensor. The input sensor unit 2010 is a common name for such sensing means. The sensing means may be included in the device as separate elements or may be integrated into at least one elements included in the device.

The input sensor unit 2010 may sense various kinds of contact and non-contact touch inputs from the user such as a slide touch input, a multi-touch input, a long press touch input, a short-press touch input, a drag touch input, a hovering input or a flicking touch input. The input sensor unit 2010 may also sense a touch input by various touch input tools such as a touch pen and a stylus pen. The input sensor unit 2010 may transfer the result of sensing of various touch inputs to the processor 2040.

The display unit 2020 may display visual information. More specifically, the display unit 2020 may display various kinds of visual information through a display panel. Herein, the visual information may represent images, pictures, photos, texts, moving images, videos, and application execution windows which are recognizable through the user's vision. Particularly, in the present disclosure, the display unit 2020 may display a video constructed with refocusable frames. At this time, the user may directly touch respective frames of the displayed video to perform the refocusing operation for each of the frames. More specifically, the user may perform the refocusing operation by designating, through a touch input, a refocus position for each of the refocusable frames constructing the video. The refocusing operation will be described in more detail below with reference to the accompanying drawings.

The storage unit 2030 may store various kinds of digital data including video data, audio data, image data and application data. Particularly, the storage unit 2030 may include refocusable image data and video data including refocusable images as frames. The storage unit 2030 represents various kinds of digital data storing space such as a flash memory, a random access memory (RAM) and a solid state drive (SSD).

The processor 2040 may processes data in the device to execute various applications. In addition, the processor 2040 may control content executed in the device, based on a content control command. In addition, the processor 2040 may control the aforementioned units of the device respectively and may also control data transmission/reception between the units.

More specifically, the processor 2040 may control the display unit 2020 such that the display unit 2020 displays video data received through data communication or the video data stored in the storage unit 2030. In addition, the processor 2040 may detect a user input using the input sensor unit 2010 and execute a command corresponding to the detected user input. Particularly, in the present disclosure, the processor 2040 may detect a touch input from the user using the input sensor unit 2010, and refocus a refocusable frame based on the detected touch input. This will be described in more detail below with reference to the accompanying drawings. Herein, the refocusable frame, which is a fame constructing video data, may represent a frame for which post correction of focus is allowed.

The processor 2040 may also generate separate video data including a frame refocused according to an input by the user. At this time, the processor 2040 may store the newly generated video data in the storage unit 2030.

Hereinafter, in the case that a step or operation performed by the device starts or is performed with sensing of an input (e.g., a touch input), it will be assumed the step include producing and receiving a signal generated according to the sensed input. In the description, the processor 2040 may be viewed as controlling the device or at least one unit included in the device according to an input, and the device may be identified with the processor 2040.

In the block diagram of FIG. 2 illustrating the device, the blocks as separately shown logically distinguish hardware constituent of the device from each other. Accordingly, the constituents of the aforementioned device may be mounted in a single chip or a plurality of chips, depending on design.

Figure 3:
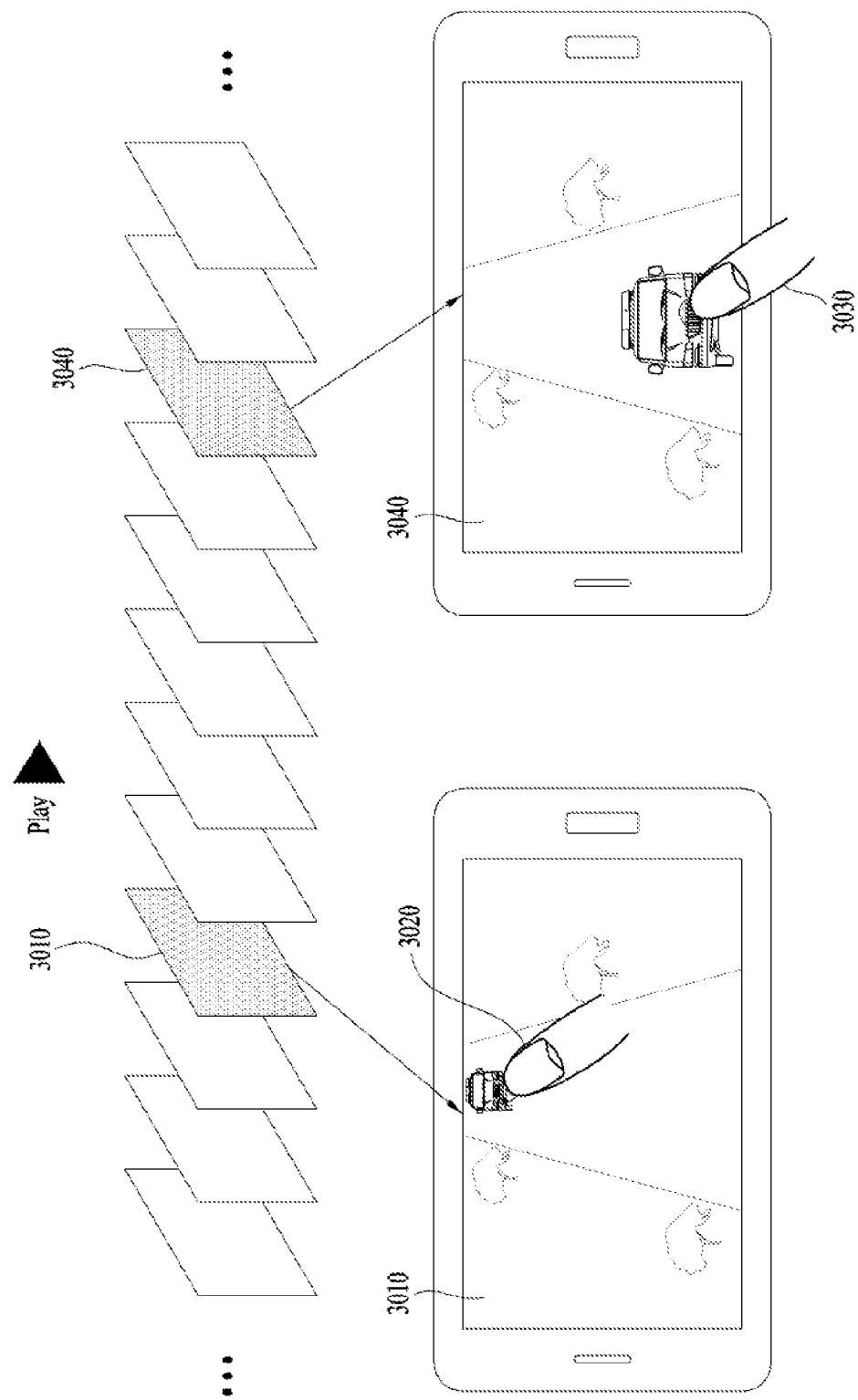
FIG. 3 is a view illustrating a display device detecting a refocusing input while video data is being played according to one embodiment.

FIG. 3 is a view illustrating a display device detecting a refocusing input while video data is being played according to one embodiment.

The device may detect a refocusing input for refocusing video data. Particularly, in the present invention, the device may detect a refocusing input for each of refocusable frames constructing video data and refocus the respective refocusable frames according to the detected refocusing input. Thereby, the device may refocus the video data.

For example, the device may detect a first input 3020 for a first frame 3010 and a second input 3030 for a second frame 3040. Herein, the first frame 3010 and the second frame 3040 may represent refocusable frames constructing video data. In addition, the second frame 3040 may represent a frame arranged after the first frame 3010 and played after the first frame 3010. In addition, according to one embodiment, the first input 3020 and the second input 3030 may represent touch inputs by the user who touches positions in the frames to be refocused. Further, the first input 3020 and the second input 3030 may be continuous or discontinuous touch inputs, which will be described later with reference to FIGS. 4 and 6. Upon detecting the first input 3020 and the second input 3030, the device may refocus the first frame 3010 and the second frame 3040 based on the positions of the first input 3020 and the second input 3030. More specifically, the device may refocus the first frame 3010 based on the detected position of the first input 3020, and refocus the second frame 3040 based on the detected position of the second input 3030. The device may designate the detected position of the first input 3020 in the first frame 3010 as a refocus position and designate the detected position of the second input 3030 in the second frame 3040 as a refocus position.

At this time, the device may detect the first input 3020 and the second input 3030 in various ways to refocus the first frame 3010 and the second frame 3040.

According to one embodiment, the device may detect an input detected while the video data is being played as a refocusing input. More specifically, the device may detect, as the first input 3020, an input detected at the time when the first frame 3010 is displayed while the video data is being played. Alternatively, the device may detect, as the second input 3030, an input detected at the time when the second frame 3040 is displayed while the video data is being played. Upon detecting the first input 3020 and the second input 3030, the device may refocus the first frame 3010 based on the position at which the first input 3020 has been detected, and may refocus the second frame 3040 based on the position at which the second input 3030 has been detected. That is, the device may detect an input detected at the time when each frame is displayed, as an input corresponding to the displayed frame, and refocus the frame based on the position of the detected input. Thereby, the user may play the video data and easily refocus the video data by directly touching desired positions while viewing the displayed frames. At this time, the first input 3020 and the second input 3030 may be continuous touch inputs or discontinuous touch inputs, which will be described later with reference to FIG. 4.

As described above, the device may detect an input as the first input 3020 or the second input 3030 while the video data is being played. However, in some embodiments, the device may detect an input as the first input 3020 or the second input 3030 while the video data is not played, which will be described later with reference to FIGS. 5 and 8B.

In the case that refocusing for the video data is completed according to the detected refocusing input, as described above, the device may generate new video data obtained by completing refocusing. For example, in the case that there is first video data including the first frame 3010 and the second frame 3040, the first video data including the first frame 3010 and the second frame 3040 refocused may be generated as second video data. Alternatively, when refocusing is completed, the device may change the video data to the video data obtained by completing refocusing and store the changed video data.

Figure 4:
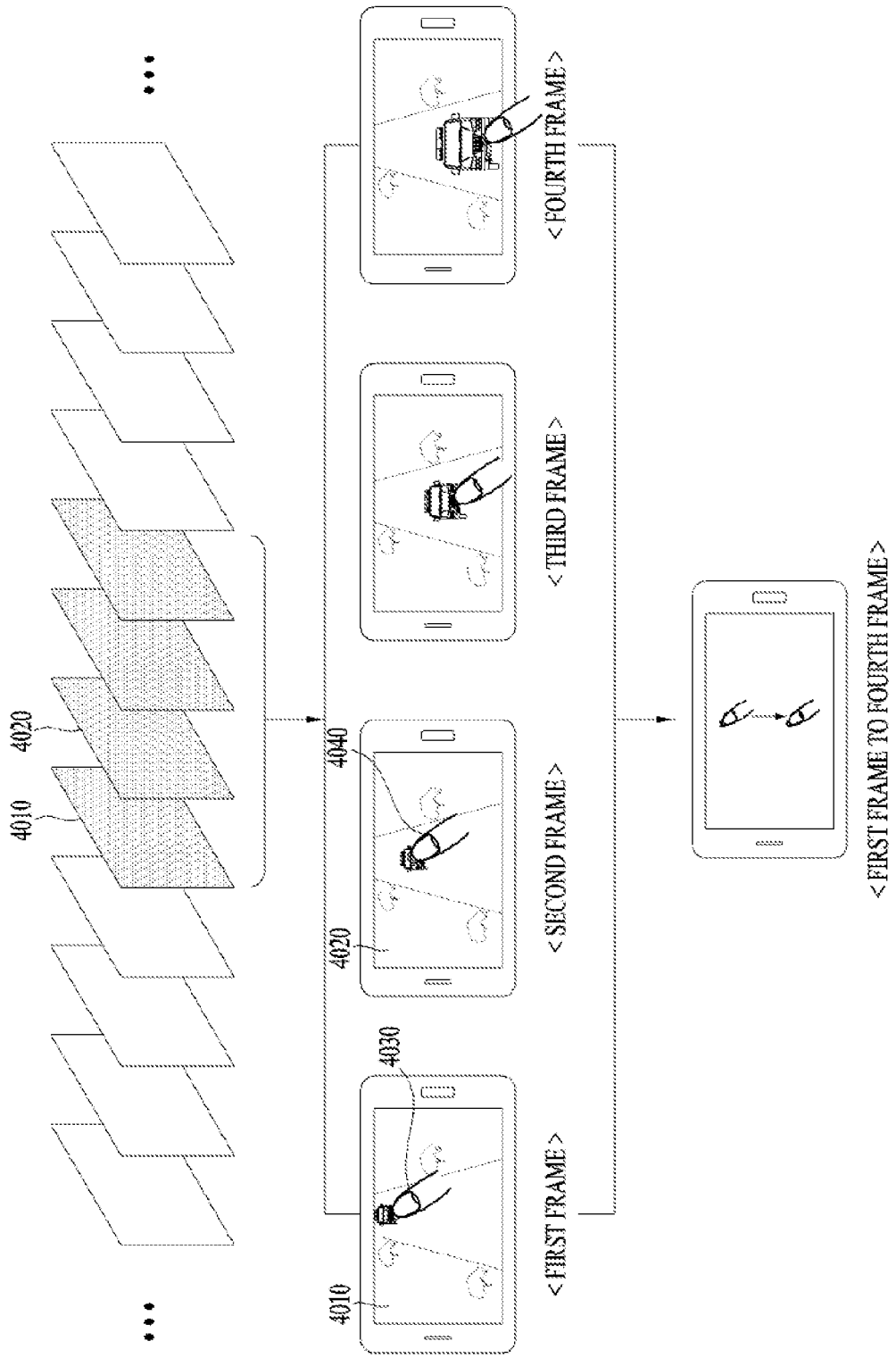
FIG. 4 is a view illustrating a display device detecting a slide touch input as a refocusing input during while video data is being played according to one embodiment.

FIG. 4 is a view illustrating a display device detecting a slide touch input as a refocusing input while video data is being played according to one embodiment.

In the present disclosure, the device may detect a first input 4030 for refocusing a first frame 4010 and a second input 4040 for refocusing a second frame 4020. Herein, the first input 4030 and the second input 4040 may be various touch inputs to the device.

According to one embodiment, the first input 4030 and the second input 4040 may be continuous touch inputs. More specifically, the second input 4040 may represent a touch input continuously detected without being released from the first input 4030. Accordingly, the first input 4030 and the second input 4040 may construct one slide touch input. In the case that the device detects such slide touch input, the device may perform refocusing based on the position of a slide touch input at the time when each frame is displayed.

For example, as shown in FIG. 4, while the first frame 4010 to fourth frame are displayed in a playing order according to playing of video data, the device may detect one continuous slide touch input corresponding to the first frame 4010 to the fourth frame. At this time, the device may perform refocusing for each of the frames based on the position of the slide touch input which the device detects at the time when each of the frames is displayed. That is, refocusing may be performed based on the position of a touch input detected at the time each of the frames is displayed, a detailed description of which has been given above with reference to FIG. 3.

According to another embodiment, although not shown in FIG. 4, the first input 4030 and the second input 4040 may be discontinuous touch inputs. Accordingly, the device may perform refocusing based on the positions of the inputs detected at the times when the corresponding frames are displayed, a detailed description of which has been given above with reference to FIG. 3.

Therefore, the user may perform target-refocusing for an object to be refocused with the video data played, by touching the object and then following continuous movement of the object or discontinuously touching the object according to discontinuous movement of the object. The user may refocus the video data by selecting a type of a refocusing input and inputting the same to the device in consideration of configuration of frames, captured content of the video data, purpose, effect and intention of refocusing.

Figure 5:
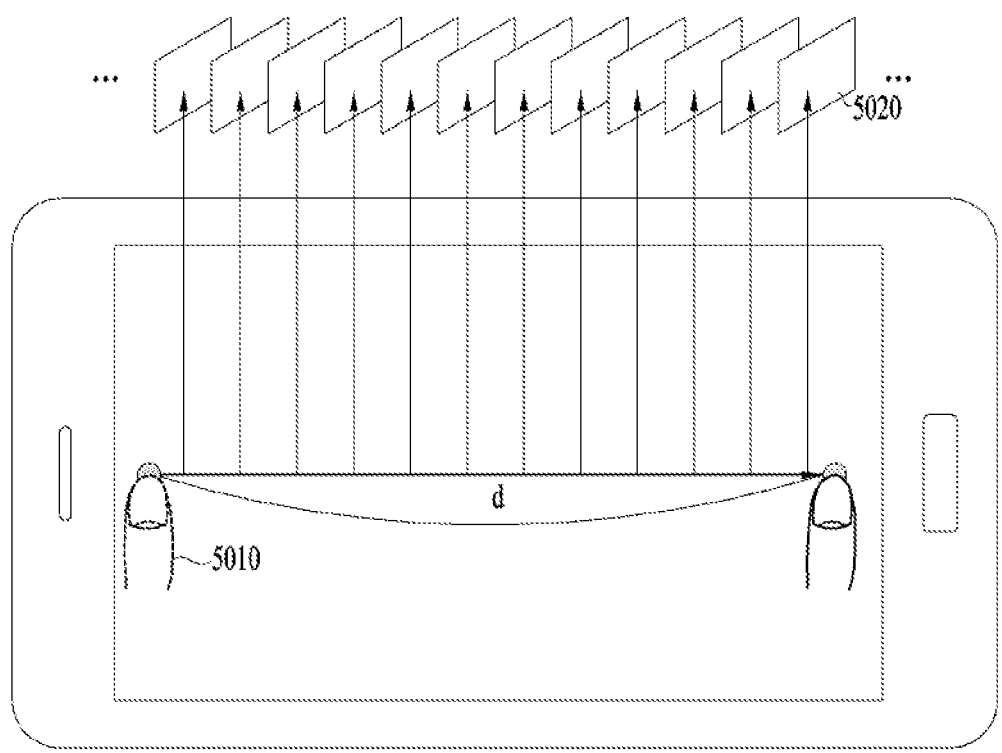
FIG. 5 is a view illustrating a display device selecting and providing frames corresponding to the length of a slide touch input according to one embodiment.

FIG. 5 is a view illustrating a display device selecting and providing frames corresponding to the length of a slide touch input according to one embodiment.

As described above with reference to FIG. 4, the device may detect a refocusing input 5010 while video data is played, but it may also detect the refocusing input 5010 while the video data is not played. In this case, the device may allow the user to directly select a frame to be refocused by sequentially providing frames corresponding to the refocusing input 5010, rather than automatically providing the user with the frames by reproducing the video data.

According to one embodiment, the device may detect a slide touch input 5010 as the refocusing input. At this time, the device may select a frame 5020 corresponding to the "length" of the slide touch input 5010 and display the selected frame 5020. More specifically, the device may select the frames included in the video data in a predetermined order (for example, in the order of playing of the video data) and sequentially provide the frames as the slide touch input 5010 is elongated. Otherwise, as the slide touch input 5010 is elongated to a predetermined length, the device select the frames included in the video data in a predetermined order and provide the same. For example, the device may select and provide a next frame in the playing order positioned after the frame 5020 which is being provided every time the slide touch input 5010 is elongated by 1 cm. The predetermined length and predetermined order may be set to various values according to manufacturing process by the manufacturer, designing of the device, design, purpose, the kind of an application being executed, and the user, and not limited to the illustrated embodiment.

In addition, the device may sequentially provide the frames according to the length of the slide touch input 5010 and at the same time perform refocusing based on the position of the slide touch input 5010 for the frame 5020 being provided. For example, in the case that the length of the slide touch input 5010 is 1 cm, the device may provide a first frame 5020 corresponding to this length. At this time, the device may refocus the first frame 5020 based on the position of the slide touch input 5010 detected when the first frame 5020 is provided. In the case that the position of the slide touch input 5010 detected at the time when the first frame 5020 is provided is a first point, the device may refocus the first frame 5020 based on the first position.

Such refocusing may be used when fine refocusing is performed as in the case in which background of the video data is fixed or movement of an object to be refocused is slow or stationary.

In view of the above, the device may sequentially provide the frames included in the video data not only in the case that the device detects one slide touch input 5010, but also in the case that the device detects a plurality of discontinuous touch inputs (not shown). That is, as the number of times of detection of discontinuous touch inputs increases, the device may select and provide the frames in a predetermined order. Even in this case, the device may detect the position of a discontinuous input touch to select a frame and then perform refocusing for the selected frame based on the position.

According to another embodiment which is not shown in FIG. 5, the device may edit the video data based on expansion speed of the slide touch input 5010. More specifically, the device may detect the expansion speed of the length of the slide touch input 5010. In the case that the detected expansion speed exceeds a threshold speed, the device may edit the video data by deleting frames in a specific section.

At this time, the expansion speed of the length of the slide touch input 5010 may be detected using the quantity of frames provided and/or selected for a predetermined time. As described above, the device of the present disclosure may sequentially select and/or provide the frames included in the video data as the length of the slide touch input 5010 extends. Accordingly, since increase in the quantity of the selected and/or provided frames means extension of the length of the slide touch input 5010, increase in the quantity of frames selected and/or provided for a predetermined time may mean increase in the expansion speed of the length of the slide touch input 5010. Considering this point, the device may detect the expansion speed of the slide touch input 5010 based on the quantity of frames selected and/or provided for a predetermined time. The expansion speed of the slide touch input 5010 may be detected through various embodiments and is not limited to the illustrated embodiment.

In the case that the expansion speed of the detected slide touch input 5010 exceeds a threshold speed, the device may edit the video data by deleting frames in a predetermined section. More specifically, in the case that the quantity of frames selected and/or provided for a predetermined time exceeds a threshold value, the device may generate video data excluding frame(s) selected and/or provided for a predetermined time, thereby editing the quantity of frames included in the video data. For example, in the case that the threshold speed is 5 frames/s and seven frames are selected and/or provided by the slide touch input 5010 for one second, the device may generate video data excluding the seven frames.

Accordingly, the user may refocus the video data and easily edit the video data through the slide touch input 5010. More specifically, by entering a slide touch input 5010, the user may select a frame 5020 to refocus and at the same time refocus the selected frame 5020. Further, by adjusting the speed of the slide touch input 5010, frames may be deleted. That is, the device of the present disclosure may simultaneously provide the functions of frame selection, frame focusing and editing of video data (e.g. editing of the quantity of frames).

FIG. 6 is a view illustrating a display device designating a refocus position for a frame including no refocus position designated by a refocusing input according to one embodiment. In this embodiment, the refocusing input may represent a discontinuous touch input detected while video data is being played.

As described above, the device may detect a first input first input 6040 for a first frame first frame 6010 and a second input second input 6050 for a second frame second frame 6030. At this time, the second frame second frame 6030 may represent a frame played after the first frame first frame 6010. Accordingly, at least one other frame may or may not be present between the first frame first frame 6010 and the second frame second frame 6030. Hereinafter, a description will be given of the case in which the device refocuses video data in which a third frame 6020 is present between the first frame first frame 6010 and the second frame second frame 6030. Herein, the first frame first frame 6010 and the second frame second frame 6030 may represent frames which includes refocus positions designated by the refocusing inputs first input first input 6040 and second input second input 6050 and are positioned in front of or behind the third frame 6020. In addition, the third frame 6020 may represent a single frame or plural frames present between the first frame first frame 6010 and the second frame second frame 6030. A refocusing input for the third frame 6020 will be defined as a third input.

While video data is being played, the device may detect a discontinuous input for each of the displayed frames and perform refocusing based on the positions of the detected touch inputs. This has been described in detail with reference to FIG. 3, and thus a detailed description thereof will be omitted below. In this case, there may be a frame 6020 for which a refocus position is not designated by a discontinuous touch input from the user. Herein, discontinuous touch inputs represent touch inputs having a certain time gap therebetween. Since the video data continues to be played even in the time gap, there may be the frame 6020 for which a refocus position is not designated by a discontinuous touch input from the user. Even in the case that the user intentionally skips designation of a refocus position for a specific frame 6020, there may be a frame 6020 for which a refocus position is not designated.

In this case, the device may designate a refocus position based on the frames for which refocus positions are designated by refocusing inputs. For example, as shown in FIG. 6, in the case that the first frame 6010 for the first input 6040 and the second input 6050 for the second frame 6030 are detected at different positions and a third input for the third frame 6020 is not detected, the device may determine a refocus position 6060 for the third frame 6020 based on the positions of the first input 6040 and the second input 6050. At this time, operation of the device designating the refocus position 6060 of the third frame 6020 based on the positions of the first input 6040 and the second input 6050 may be implemented according to various embodiments.

According to one embodiment, when video data for which refocusing is completed is played, the device may designate the refocus position 6060 of the third frame 6020 such that the focus moves along a specific path. More specifically, the device may designate the refocus position 6060 of the third frame 6020 such that the focus moves along a path extending from the refocus position of the first frame 6010 to the refocus position of the second frame 6030. For example, as shown in FIG. 6, the device may designate the refocus position 6060 of the third frame 6020 such that the focus moves along a straight path extending from the refocus position of the first frame 6010 to the refocus position of the second frame 6030. The device may designate various paths of different shapes extending from the refocus position of the first frame 6010 to the refocus position of the second frame 6030, without being limited to the straight path described above.

According to another embodiment, in the case that the refocused object in the first frame 6010 is identical to that in the second frame 6030 and the third frame 6020 includes the same object, the device may designate the position of the object in the third frame 6020 as the refocus position 6060. For example, as shown in FIG. 6, in the case that a refocused object in the first frame 6010 and the second frame 6030 is a car and the third frame 6020 contains the same car, the device may designate the position of the car as the refocus position 6060 of the third frame 6020.

In addition, the device may designate the refocus position of the third frame 6020 through various embodiments such as designating the position identical to the refocus position of the first frame 6010 or the second frame 6030 as the refocus position of the third frame 6020.

Figure 7A:
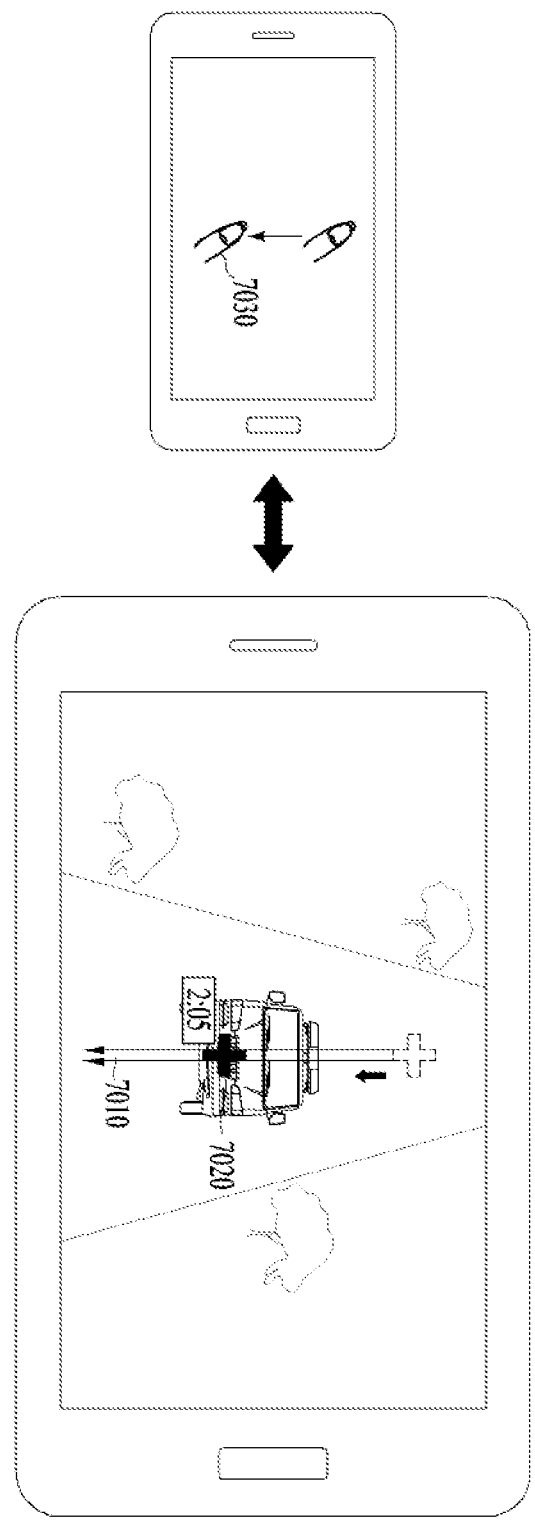
FIG. 7A is a view illustrating a display device providing a refocus indicator according to one embodiment.

FIG. 7A is a view illustrating a display device providing a refocus indicator according to one embodiment.

The device may provide a refocus indicator 7010 for indicating a refocus position. By displaying the refocus indicator 7010 to indicate a refocus position, the device may provide the user with information about the refocus positions and shape designated by the user and change of the refocus positions.

According to one embodiment, the device may provide a refocus indicator indicating refocus positions of entire frames included in the video data. More specifically, the device may provide a refocus indicator 7010 that represents refocus positions of the entire frames contained in the video data for which refocusing is completed.

In the case that a refocus position is designated for the entire frames by a continuous touch input 7030, the device may display a directionality image (e.g., an arrow) indicating the movement path of a refocus position as the refocus indicator 7010. For example, as shown in FIG. 7A, when the user enters a slide touch input 7030 directed downward, the device may display an arrow indicating a movement path directed downward at the position where the slide touch input 7030 from the user is detected. Through the refocus indicator 7010, the user may easily recognize the path along which the refocus positions change for the entire fames.

On the other hand, in the case the refocus positions are designated for the entire frames by a discontinuous touch input, the device may provide various images at the refocus positions as the refocus indicator 7010. For example, the refocus position of the first frame may be a first point, the refocus position of the second frame may be a second point, and the first and second inputs may be discontinuous touch inputs. At this time, the device displays a cross image as the refocus indicator 7010 at the first point and the second point to indicate the refocus positions. Accordingly, there may be various embodiments of the image displayed as the refocus indicator 7010.

The refocus indicator 7010 may be provided in the case that video data for which refocusing is completed is played. A sub-indicator 7020 indicating the refocus position in a frame being currently displayed may be additionally displayed. For example, in producing video data, the device may display an arrow image indicating the refocus positions of the entire frames as the refocus indicator 7010, as described above. At this time, the device may also display a sub-indicator 7020 (e.g, across image) indicating the refocus position of a frame being currently displayed. More specifically, the device may display the sub-indicator 7020 at the refocus position of the frame being currently displayed. Accordingly, as the video data is played, the sub-indicator 7020 may move along the displayed refocus indicator 7010. Therefore, the user may easily recognize not only the refocus positions for the entire frames but also the refocus position of a frame being currently displayed through the refocus indicator 7010 and the sub-indicator 7020.

FIG. 7B is a view illustrating a display device adjusting image properties of a refocus indicator 7010 and displaying the refocus indicator 7010 in the case that the same point in plural frames is designated as a refocus position, according to one embodiment.

As described above with reference to FIG. 7A, the device may provide a refocus indicator 7010 indicating a refocus position. At this time, the device may display various kinds of information related to refocusing of frames in addition to the refocus position by adjusting image properties of the refocus indicator 7010.

According to one embodiment, the device may adjust the thickness of the refocus indicator 7010 to indicate the quantity of frames for which the same position is designated as the refocus position. In other words, in the case that the same position is designated as the refocus position for plural frames, the device may adjust the thickness of the refocus indicator 7010 based on the "number" of the plural frames including the identical refocus position and display the adjusted refocus indicator 7010. More specifically, the device may detect increase in the quantity of frames including the same refocus position. At this time, the device may increase thickness of a specific area of the refocus indicator 7010 indicating the corresponding refocus position and display the adjusted refocus indicator 7010. In contrast, the device may detect decrease in the quantity of frames including the same refocus position. At this time, the device may decrease thickness of a specific area of the refocus indicator 7010 indicating the corresponding refocus position and display the adjusted refocus indicator 7010.

For example, as shown in FIG. 7B, refocus positions for the entire frames may be continuously designated by the continuous touch input 7030. At this time, the device may display the refocus indicator 7010 indicating the refocus positions, in the case that a plurality of frames has the same refocus position, the device may increase the thickness of an area of the refocus indicator 7010 indicating the refocus position based on the quantity of the corresponding frames and display the adjusted refocus indicator 7010.

According to another embodiment, as shown in FIG. 7B, refocus positions for the entire frames may be discontinuously designated by a discontinuous touch input. At this time, the device may display the refocus indicator 7010 indicating the refocus positions. In the case that a plurality of flames has the same refocus position, the device may increase the thickness of an area of the refocus indicator 7010 indicating the refocus position and display the adjusted refocus indicator 7010. Or, the device may increase the size of the area of the refocus indicator 7010 indicating the refocus position. For example, in the case that a circle image is displayed as the refocus indicator 7010, the device may adjust the radius of the circle in accordance with the quantity of frames including the same refocus position. Thereby, the device may adjust the thickness or size of the refocus indicator 7010. Accordingly, in the case that ten frames include the first point designated as the refocus position and twenty frames include the second point designated as the refocus position, the radius r1 of the refocus indicator 7010 displayed at the second point may be greater than the radius r2 of the refocus indicator 7010 displayed at the first point.

In addition, the device may provide various kinds of information about the refocused frames by adjusting various image properties such as color, darkness, brightness and contrast of the refocus indicator 7010 and displaying the adjusted refocus indicator 7010. In addition, the device may provide various kinds of information about the refocused frames by providing various graphing effects to the refocus indicator 7010.

Meanwhile, as described above with reference to FIG. 7A, the device may additionally provide a sub-indicator 7020 to the refocus indicator 7010. At this time, the device may adjust image properties (e.g., color, size, contrast, darkness, brightness, etc.) of the sub-indicator 7020 and display the sub-indicator 7020, as it does for the refocus indicator 7010.

For example, in the case that the sub-indicator 7020 moves on the refocus indicator 7010 when video data is played, the sub-indicator 7020 may stop movement at a position on the refocus indicator 7010 at which the thickness of the refocus indicator 7010 has increased. Meanwhile, the size of the sub-indicator 7020 may gradually increase as the video data is played. In the case that the size of the sub-indicator 7020 gradually increases and thus matches the increased thickness of the refocus indicator 7010, the size of the sub-indicator 7020 may be adjusted to a size matching the thickness of the refocus indicator 7010 at the next position to which the sub-indicator 7020 subsequently moves, such that the sub-indicator 7020 continues to move on the refocus indicator 7010. That is, as the quantity of frames including the same refocus position, the sub-indicator 7020 may stay on the refocus position longer and the size thereof may be adjusted to gradually increase. Accordingly, the user may acquire various kinds of information about refocusing of the frames through the size of the sub-indicator 7020 and the expansion speed of the size.

Figure 8A:
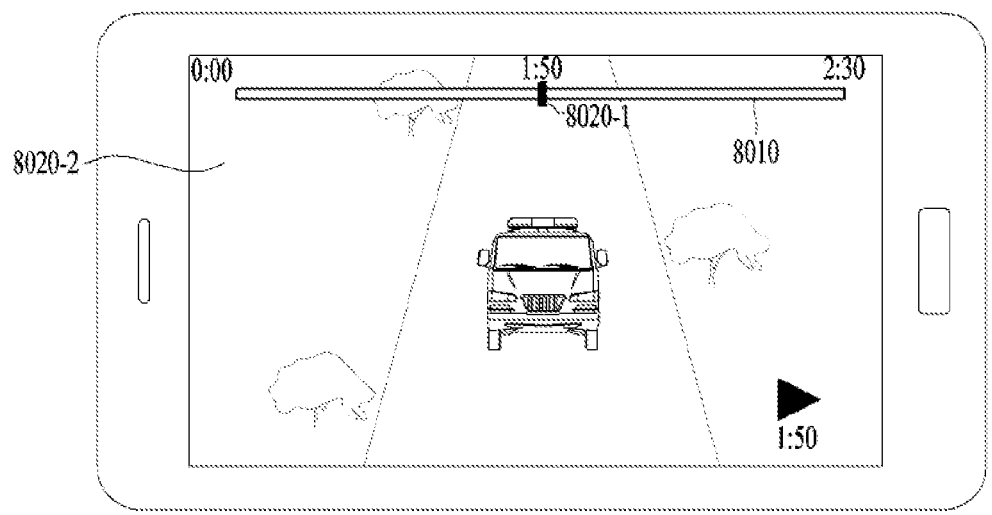
FIG. 8A is a view illustrating a display device providing a timeline interface according to one embodiment.

FIG. 8A is a view illustrating a display device providing a timeline interface according to one embodiment.

The device may provide a timeline interface 8010 corresponding to the playing sequence of the video data. Herein, the playing sequence is a set of a plurality of frames contained in the video data. The playing sequence may represent information about an order in which the frames are played. Graphic user interface (GUI) providing information about the playing sequence based on the playing time may be defined as the timeline interface 8010. The timeline interface 8010 may provide various kinds information about playing properties such as playing speed of the video data, overall playing time and current playing time. Accordingly, the user may acquire various kinds of information about playing of the video data being currently played, through the timeline interface 8010. In addition, in the present disclosure, the timeline interface 8010 may be used in refocusing a frame 8020-2 corresponding to each point 8020-1 of the timeline interface 8010, which is described in detail below with reference to FIG. 8B.

Hereinafter, a description will be given of a device providing the timeline interface 8010. In addition, an embodiment of refocusing a frame 8020-2 corresponding to each point 8020-1 on the timeline interface 8010 using the timeline interface 8010 will be described in detail later.

Figure 8B:
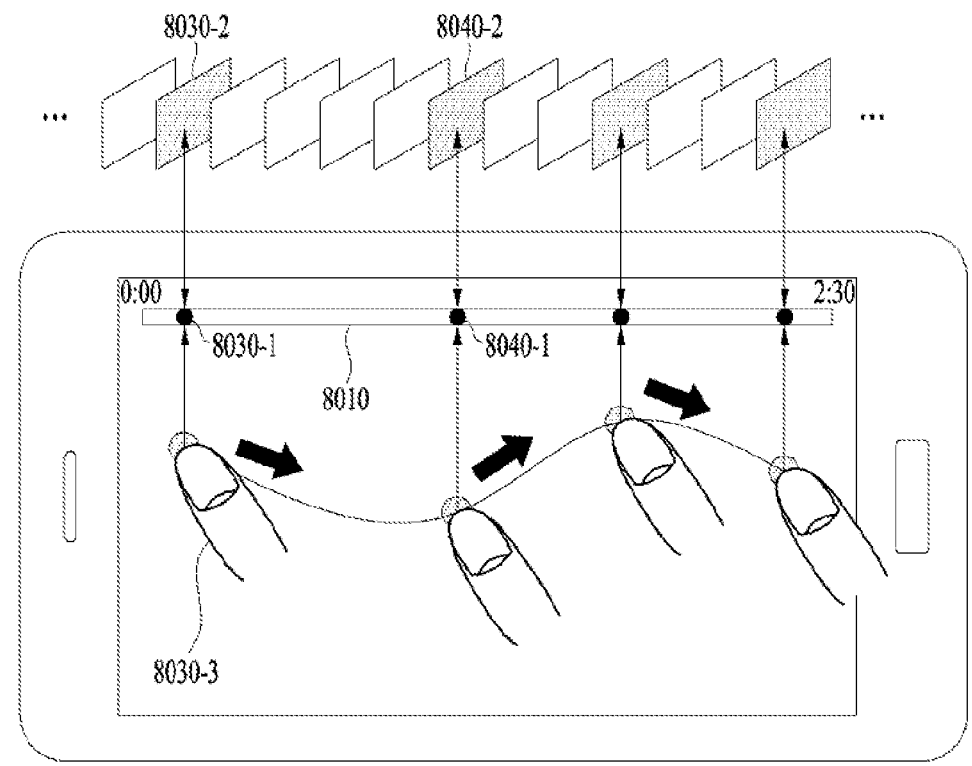
FIG. 8B is a view illustrating a display device refocusing each frame using a refocusing input and a timeline interface according to one embodiment.

FIG. 8B is a view illustrating a display device refocusing each frame using a refocusing input and a timeline interface according to one embodiment.

The device may provide a timeline interface 8010 corresponding to the playing sequence of the video data. At this time, the points 8030-1 and 8040-1 on the timeline interface 8010 may correspond to the frames 8030-2 and 8040-2 of the video data respectively. For example, the first point 8030-1 on the timeline interface 8010 may correspond to the first frame 8030-2 of the video data, and the second point 8040-1 on the timeline interface 8010 may correspond to the second frame 8040-2 of the video data.

The device may detect inputs corresponding to the points 8030-1 and 8040-1 on the timeline interface 8010 as refocusing inputs for the frames 8030-2 and 8040-2 corresponding to the points 8030-1 and 8040-1. More specifically, the device may detect may detect inputs corresponding to the "positions" of the points 8030-1 and 8040-1 on the timeline interface 8010 as refocusing inputs for the frames 8030-2 and 8040-2 corresponding to the points 8030-1 and 8040-1.

For example, as shown in FIG. 8B, the device may detect a touch input 8030-3 placed on a vertical line matching the first point 8030-1 as a first input. Herein, the first input 8030-3 may represent a refocusing input for refocusing the first frame 8030-2. Upon detecting the first input 8030-3, the device may refocus the first frame 8030-2 based on the position of the first input 8030-3.

The refocusing inputs corresponding to the timeline interface 8010 may be continuously or discontinuously detected touch inputs corresponding to the timeline interface 8010. The device may detect touch inputs corresponding to respective points on the timeline interface 8010 and refocus the frames 8030-2 and 8040-2 corresponding respectively to the points 8030-1 and 8040-1 based on the positions of the detected touch inputs. In the case that a refocusing input is detected without the video data being played, and the detected refocusing input is a touch input, the device may select and provide a frame corresponding to the "length" of the refocusing input, which has been described in detail above with reference to FIG. 5.

FIG. 9 is a view illustrating a display device scaling and detecting a slide touch input based on a timeline interface and refocusing a frame based on the detected slide touch input according to one embodiment.

The horizontal width of a timeline interface 9010 may be determined based on the total quantity of frames contained in the video data. According to one embodiment, the horizontal width w1 of the timeline interface 8010 may be elongated or shortened in proportion to the total quantity of frames contained in the video data. Accordingly, as the total quantity of frames contained in the video data increases, the horizontal width w1 of the timeline interface 9010 may be elongated. Alternatively, as the total quantity of frames contained in the video data decreases, the horizontal width w1 of the timeline interface 9010 may be shortened.

At this time, the device may detect a slide touch input 9020 having a horizontal width w2 different from the horizontal width w1 of the timeline interface 9010 as a refocus input. In this case, the device may use the detected slide touch input 9020 to perform refocusing for all the frames include in the timeline interface 9010 having a different horizontal width. The device may scale the slide touch input 9020 based on the timeline interface 9010, thereby performing refocusing for all the frames included in the timeline interface 9010.

According to one embodiment, in the case that the horizontal width w2 of the detected slide touch input 9030-1 is longer than the horizontal width w1 of the timeline interface 9010, the device may scale down the horizontal width w2 of the slide touch input 9030-1 (see FIG. 9(a)). More specifically, in the case that the horizontal width w2 of the detected slide touch input 9030-1 is longer than the horizontal width w1 of the timeline interface 9010, the device may scale down the horizontal width w2 of the slide touch input 9030-1 based on the horizontal width w1 of the timeline interface 9010 and detect a scaled-down 90302. Once scaling down of the horizontal width w2 of the slide touch input 9030-1 is completed, the device may refocus frames corresponding to respective points on the timeline interface 9010 based on the scaled-down 90302, as in the embodiment illustrated in FIG. 8B.

According to another embodiment, in the case that the horizontal width w2 of a detected slide touch input 9040-1 is shorter than the horizontal width w1 of the timeline interface 9010, the device may scale up the horizontal width w2 of the slide touch input 9040-1 (see FIG. 9(b)). More specifically, in the case that the horizontal width w2 of the detected slide touch input 9040-1 is shorter than the horizontal width w1 of the timeline interface 9010, the device may scale up the horizontal width w2 of the slide touch input 9040-1 based on the horizontal width w1 of the timeline interface 9010 and detect a scaled-up slide touch input 9040-2. Once scaling up of the horizontal width w2 of the slide touch input 9040-1 is completed, the device may refocus frames corresponding to respective points on the timeline interface 9010 based on the scaled-up touch input 9040-2, as in the embodiment illustrated in FIG. 8B.

Figure 10:
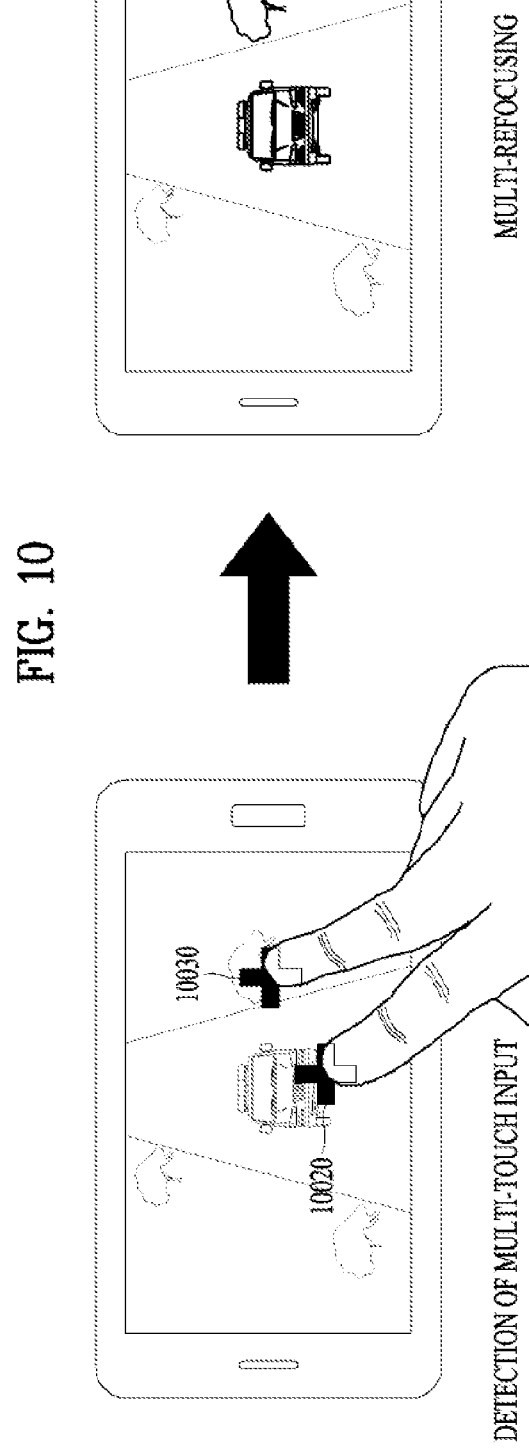
FIG. 10 is a view illustrating a display device detecting a multi-touch input as a refocusing input and refocusing a frame according to one embodiment.

FIG. 10 is a view illustrating a display device detecting a multi-touch input as a refocusing input and refocusing a frame according to one embodiment.

The device may detect a multi-touch input 10010 as a refocusing input for a frame. Herein, the multi-touch input 10010 may represent touch inputs that are simultaneously detected at a plurality of points 10020 and 10030. The user may use plural fingers or plural tools. (e.g., stylus pens) to touch a plurality of points simultaneously to input the multi-touch input 10010 to the device.

In the case that the device detects such multi-touch input 10010, the device may perform multi-refocusing for a frame based on the points 10020 and 10030 included in the multi-touch input 10010. When there is a plurality of objects in one frame that the user desires to bring into focus, or the user desires to generate 3D video data, the user may use the multi-touch input 10010. In addition, the device may generate new video data for which refocusing is completed according to the multi-touch input 10010.

Figure 11:
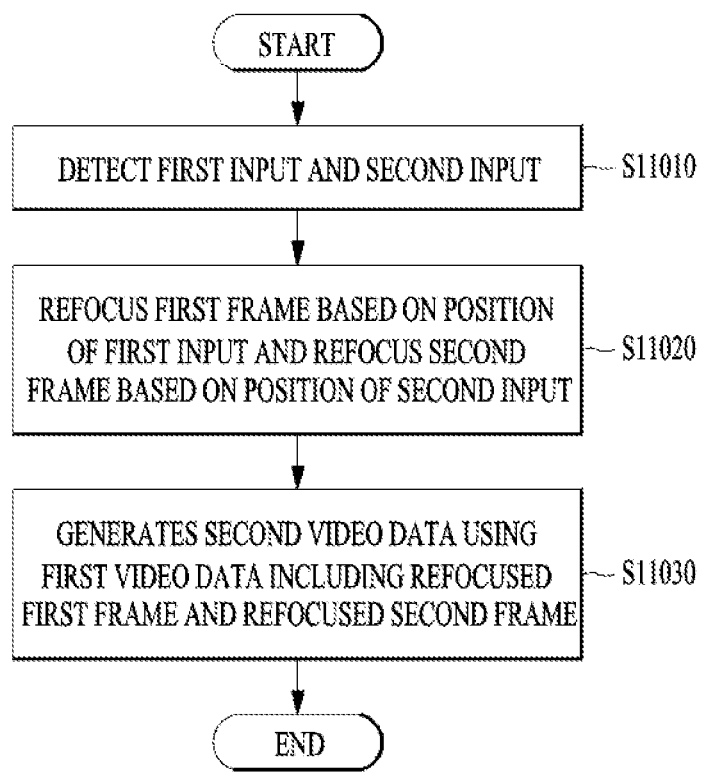
FIG. 11 is a flowchart illustrating a method of controlling a display device according to an embodiment.

FIG. 11 is a flowchart illustrating a method of controlling a display device according to an embodiment. In the flowchart, description of the elements similar to or identical to those described above with reference to FIGS. 1 to 10 has been omitted.

The device may detect a first input and a second input first (S11010). Herein, the first frame may represent a refocus input fir a first frame, and the second input represent a refocus input for a second input. The device may detect a touch input entered while the video data is being played as a refocus input, or may detect a touch input corresponding to a timeline interface as a refocus input. This has already been described in detail with reference to FIGS. 3 to 9. In addition, the first and second inputs may represent continuous touch inputs or discontinuous touch inputs. In the case that the first and second inputs are continuous touch inputs, the first and second inputs may construct one slide touch input. In addition, the first frame and the second frame may represent refocusable frames contained in first video data. In addition, the second frame may represent a frame played after the first frame. Accordingly, there may be no frame present between the first and second frames or there may be at least one frame between the first and second frames.

Next, the device may refocus the first frame based on the position of the first input, and refocus the second frame based on the position of the second input (S11020). At this time, the device may use pre-stored light information about the first frame to refocus the first frame based on the position of the first input. In addition, the device may use pre-stored light information about the second frame to refocus the second frame based on the position of the second input. The refocusing method has been described in detail with reference to FIG. 1.

Next, the device may generate first video data including the refocused first frame and the refocused second frame as the second video data (S11030). The device may generate the first video data with the first and second frames refocused as the second video data and store the same in place of or in addition to the first video data. Accordingly, in the case that the second video data is played, the frames for which refocusing is completed may be sequentially played.

Although not shown in the flowchart, the device may provide a refocus indicator. The refocus indicator may represent an indicator that indicates a refocus position designated by the user. The refocus indicator may be displayed when the video data for which refocusing is completed is played. The user may more easily recognize the refocus positions for the entire frames through the refocus indicator. This has been described in detail with reference to FIG. 7A. in addition, properties of the refocus indicator may be changed based on the quantity of frames including the same refocus position, which has been described in detail with reference to FIG. 7B.

Although not shown in the flowchart, the device may provide a timeline interface. Herein, the timeline interface may represent GUI providing information about the playing sequence based on the playing time. The user may designate a refocus position for each of the frames contained in the video data by touching the device to correspond to the timeline interface. In other words, the device may detect touch inputs corresponding to respective points on the timeline interface and refocus the frames corresponding to the respective points based on the positions of the touch inputs. This has been described in detail with reference to FIGS. 8A to 9.

Although descriptions have been given for the respective drawings for simplicity of illustration, embodiments illustrated in the drawings may also be merged into a new embodiment. The scope of the present disclosure covers designing a recording medium readable by a computer having a program recorded to execute the previous embodiments as desired by those skilled in the art.

The device and a control method for the same according to the present disclosure are not limited to the above embodiments. Parts or all of the above embodiments can be selectively combined to make various variations.

It will be apparent to those skilled in the art that various modifications and variations can be made in the present disclosure without departing from the spirit or scope of the present disclosure. Thus, the present invention is intended to cover the modifications and variations of this disclosure provided they come within the scope of the appended claims and their equivalents. The variations should not be separately understood from the spirit or prospect of the present disclosure.

In addition, a device and a control method for the same in the present disclosure may be implemented in a recording medium readable by a processor provided to a network device as a code readable by the processor. The recording medium readable by the processor includes all kinds of recording devices to store data readable by the processor. Examples of the recording medium readable by the processor include ROMs, RAMs, magnetic tapes, floppy disks, and optical data storage devices. Examples also include implementation in the form of carrier wave such as transmission over the Internet. In addition, the recording medium readable by the processor may be distributed to a computer system connected over a network, and thus codes readable by the processor may be stored and executed in a distributed system.

In addition, in the present disclosure, the length may be viewed as not only indicating an accurate value but also including a substantial length within a certain range. That is, in the present disclosure, the length may represent a substantial length and have an error within a certain range.

In this specification, both a product invention and a method invention have been described. The descriptions thereof may be supplementarily applicable, when necessary.

As is apparent from the above description, the present disclosure has effects as follows.

According to one embodiment, a display device selects and provides frames in the playing order according to the length of a refocusing input. Accordingly, the display device may provide information about a frame for which refocusing is being performed and allow fine refocusing.

According to another embodiment, a display device provides a refocus indicator to indicate a refocus position. Accordingly, the user may easily acquire information about refocus positions of the entire frames through the refocus indicator.

According to another embodiment, a display device detects a refocusing input based on a timeline interface. Accordingly, the user may designate a desired position as a refocus position at desired timing based on the timeline interface.

According to another embodiment, a display device scales a refocusing input based on the timeline interface. Accordingly, malfunction resulting from detection of a refocusing input which does have a corresponding point on the timeline interface may be prevented.

Details of the effects have been described above.

What is claimed is:

1. A display device comprising:
an input sensor unit configured to sense an input to the display device;
a storage unit configured to store first video data containing refocusable frames;
a display unit configured to display visual information including the first video data; and
a processor configured to control the input sensor unit, the storage unit and the display unit,
wherein the processor is further configured to:
provide a timeline interface corresponding to a playing sequence of the first video data,
when a slide touch input constructed with a first input for a first frame of the first video data and a second input for a second frame of the first video data is detected, select each frame in the first video data in a playing order in proportion to a length of the slide touch input and sequentially provide each of the selected frame as the length of the slide touch input extends,
refocus the first frame based on a position of the detected first input, and refocus the second frame based on a position of the detected second input, and
generate second video data using the first video data including the refocused first frame and the refocused second frame,
wherein the second frame is a frame played after the first frame, and
wherein the timeline interface includes a first point and a second point, the first point corresponds to the first frame of the first video data, and the second point corresponds to the second frame of the first video data.

2. The display device according to claim 1, wherein the first input and the second input are inputs detected while the first video data is being played.

3. The display device according to claim 2, wherein, when the first video data is being played, the processor is further configured to:
detect an input detected when the first frame included in the first video data is displayed as the first input, and
detect an input detected when the second frame included in the first video data is displayed as the second input.

4. The display device according to claim 1, wherein, when the selected frame is refocused, the processor is further configured to:
refocus the selected frame based on a position of the slide touch input detected when the selected frame is provided, and
generate the second video data using the first video data including the refocused frame.

5. The display device according to claim 4, wherein, when a quantity of frames selected for a predetermined time exceeds a threshold value, the processor is further configured to generate the second video data using the first video data excluding the frames selected for the predetermined time.

6. The display device according to claim 1, wherein, when a third frame is present between the first frame and the second frame and a third input for the third frame is detected, the processor is further configured to refocus the third frame based on a position of the detected third input.

7. The display device according to claim 1, wherein the first input is a multi-touch input detected simultaneously at multiple points on the display unit.

8. The display device according to claim 7, wherein, when the multi-touch input is detected as the first input, the processor is further configured to multi-refocus the first frame based on positions of the multiple points included in the multi-touch input.

9. The display device according to claim 1, wherein, when the second video data is played, the processor is further configured to display a refocus indicator indicating a first refocus position of the first frame and a second refocus position of the second frame.

10. The display device according to claim 9, wherein, when the refocus indicator is displayed, the processor is further configured to:
- display the refocus indicator for the first frame at the position of the detected first input, and
- display the refocus indicator for the second frame at the position of the detected second input.

11. The display device according to claim 9, wherein, when refocus positions of plural frames are set to a same position, the processor is further configured to adjust a thickness of the refocus indicator based on a quantity of the plural frames including the same refocus position.

12. The display device according to claim 11, wherein the processor is further configured to:
- adjust the thickness of the refocus indicator as the quantity of the plural frames including the same refocus position is increased, and
- display the adjusted refocus indicator.

13. The display device according to claim 1, wherein the processor is further configured to:
- when an input corresponding to the position of the first point is detected, detect the input as the first input and refocus the first frame based on the position of the first input, and
- when an input corresponding to the position of the second point is detected, detect the input as the second input and refocus the second frame based on the position of the second input.

14. The display device according to claim 13, wherein the processor is further configured to refocus for all frames included in the timeline interface based on the detected slide touch input.

15. The display device according to claim 14, wherein, when a horizontal width of the slide touch input differs from a horizontal width of the timeline interface, the processor is further configured to scale the horizontal width of the slide touch input based on the horizontal width of the timeline interface.

16. The display device according to claim 15, wherein the processor is further configured to:
- scale up the horizontal width of the slide touch input based on the horizontal width of the timeline interface when the horizontal width of the slide touch input is shorter than the horizontal width of the timeline interface, and
- scale down the horizontal width of the slide touch input based on the horizontal width of the timeline interface when the horizontal width of the slide touch input is longer than the horizontal width of the timeline interface.

17. The display device according to claim 15, wherein, when the slide touch input is scaled, the processor is further configured to:
- refocus the first frame based on a position of the scaled slide touch input corresponding to the position of the first point on the timeline interface,
- refocus the second frame based on a position of the scaled slide touch input corresponding to the position of the second point on the timeline interface, and
- generate the second video data using the first video data including the refocused first frame and the refocused second frame.

18. A method for controlling a display device configured to provide first video data containing refocusable frames, the method comprising:
- providing a timeline interface corresponding to a playing sequence of the first video data;
- detecting a slide touch input constructed with a first input for a first frame of the first video data and a second input for a second frame of the first video data, wherein the second frame is a frame played after the first frame;
- selecting each frame in the first video data in a playing order in proportion to a length of the slide touch input and sequentially providing each of the selected frame as the length of the slide touch input extends;
- refocusing the first frame based on a position of the detected first input and refocusing the second frame based on a position of the detected second input; and
- generating second video data using the first video data including the refocused first frame and the refocused second frame,
wherein the timeline interface includes a first point and a second point, the first point corresponds to the first frame of the first video data, and the second point corresponds to the second frame of the first video data.

* * * * *